(12) United States Patent
Dempski

(10) Patent No.: US 6,883,032 B1
(45) Date of Patent: Apr. 19, 2005

(54) METHOD AND SYSTEM FOR COLLECTING DATA ON THE INTERNET

(75) Inventor: David R. Dempski, Washington, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/497,006

(22) Filed: Feb. 2, 2000

(51) Int. Cl.[7] .............................................. G06F 15/16
(52) U.S. Cl. ...................... 709/229; 709/203; 709/206; 709/217
(58) Field of Search ................................ 709/201, 202, 709/203, 206, 216, 217, 218, 219, 223, 224, 225, 247, 228, 100; 701/48; 715/501.1, 10; 707/5, 501.1; 713/2, 201; 717/173

(56) References Cited

U.S. PATENT DOCUMENTS

| | | | |
|---|---|---|---|
| 5,740,252 A | * | 4/1998 | Minor et al. ................. 713/153 |
| 5,774,870 A | | 6/1998 | Storey |
| 5,794,210 A | | 8/1998 | Goldhaber et al. |
| 5,796,952 A | * | 8/1998 | Davis et al. ................. 709/224 |
| 5,848,396 A | | 12/1998 | Gerace |
| 5,892,917 A | * | 4/1999 | Myerson ..................... 709/224 |
| 5,918,014 A | | 6/1999 | Robinson |
| 5,933,811 A | | 8/1999 | Angles et al. |
| 6,128,663 A | * | 10/2000 | Thomas ....................... 709/228 |
| 6,161,071 A | * | 12/2000 | Shuman et al. ............... 701/48 |
| 6,205,579 B1 | * | 3/2001 | Southgate .................... 717/173 |
| 6,249,282 B1 | * | 6/2001 | Sutcliffe et al. ............ 709/206 |
| 6,256,739 B1 | * | 7/2001 | Skopp et al. ................ 709/229 |
| 6,345,289 B1 | * | 2/2002 | Lotspiech et al. ........... 709/203 |
| 6,366,298 B1 | * | 4/2002 | Haitsuka et al. ............ 709/219 |
| 6,405,222 B1 | * | 6/2002 | Kunzinger et al. .......... 715/501.1 |
| 6,473,855 B1 | * | 10/2002 | Welder ........................... 713/2 |
| 6,487,538 B1 | * | 11/2002 | Gupta et al. ................ 709/219 |
| 6,516,416 B1 | * | 2/2003 | Gregg et al. ................ 713/201 |
| 6,529,952 B1 | * | 3/2003 | Blumenau ................... 709/223 |
| 6,535,889 B1 | * | 3/2003 | Headrick et al. ........... 709/218 |
| 2002/0035560 A1 | * | 3/2002 | Sone ............................. 707/5 |
| 2002/0091725 A1 | * | 7/2002 | Skok ........................ 707/501.1 |
| 2003/0041239 A1 | * | 2/2003 | Shear et al. ................ 713/156 |
| 2003/0191970 A1 | * | 10/2003 | Devine et al. .............. 713/201 |

* cited by examiner

Primary Examiner—Paul H. Kang

(57) ABSTRACT

A method and system for using a computer to gather information of an end user's visits to web pages and the duration and date of each visit, and then pairing this data with the user's demographic data. The method and system include the steps of monitoring the web pages the end user visits; recording the duration and date of each visit to a web page; and saving the recorded information in the end user's computer. The method and system further include the steps of providing a data processing computer for storing demographic data of the end user; storing the end user's demographic data in the data processing computer; uploading upon selective operation by the end user's computer in one direction from the end user's computer to the data processing computer, the duration and date of visit information saved to the end user's computer; matching the information uploaded with the end user's demographic data; collating based on the end user's demographic information, the information resulting from the previous step, and saving this information in the data processing computer. The above steps are then repeated for more than one end user.

20 Claims, 6 Drawing Sheets

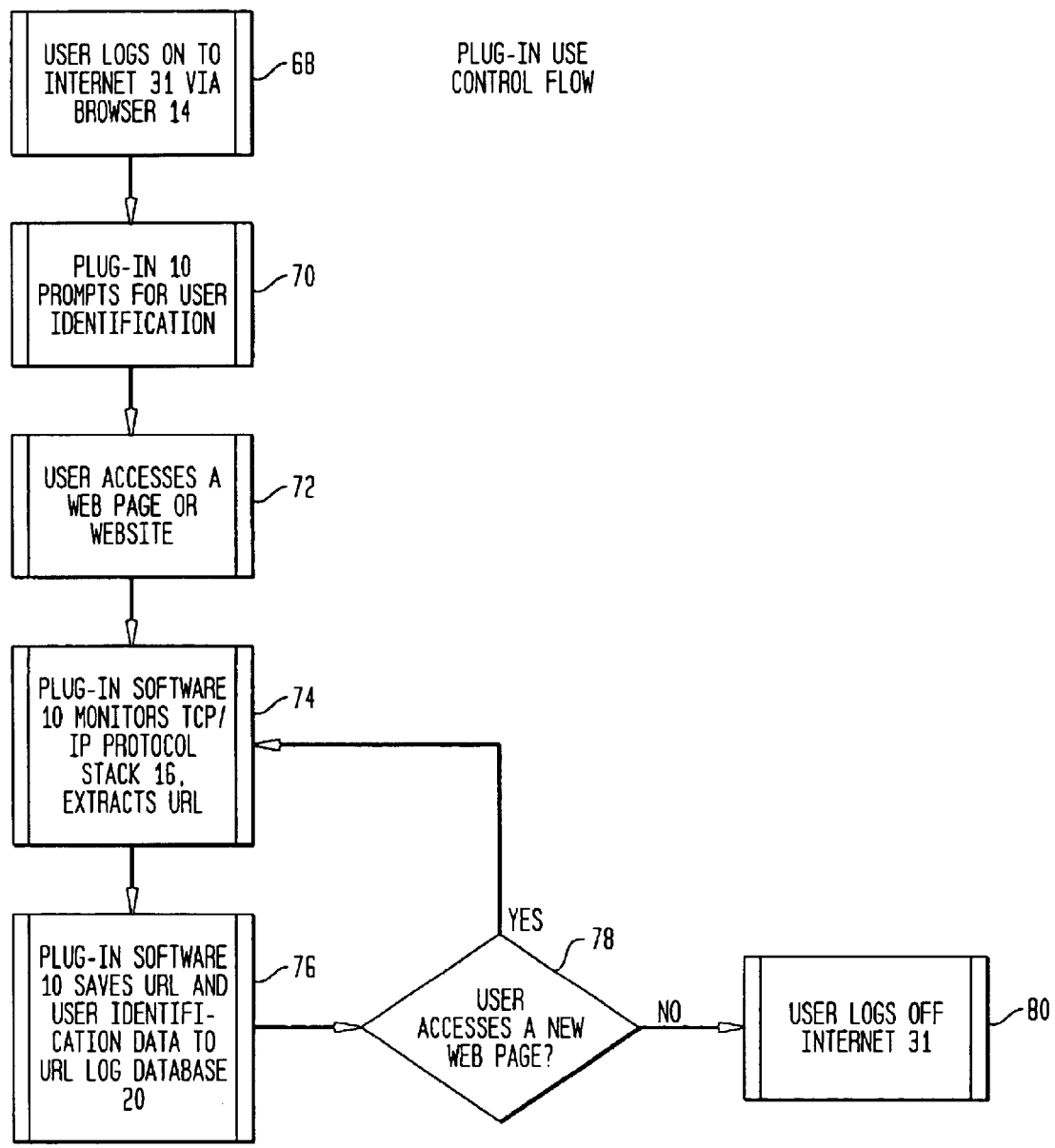

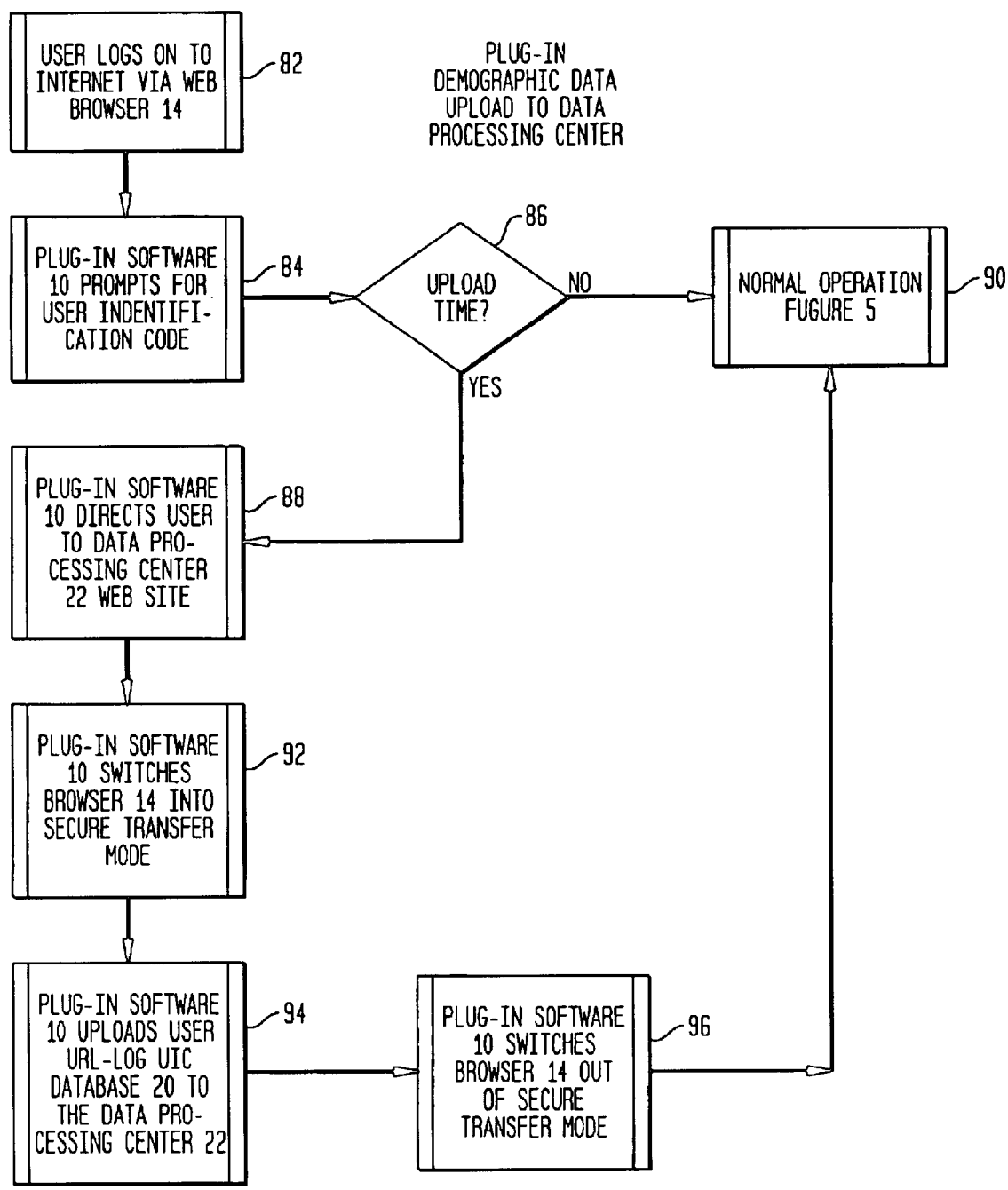

METHOD AND SYSTEM FOR COLLECTING DATA ON THE INTERNET

FIELD OF THE INVENTION

The present invention relates to a method and system for collecting and recording information over the Internet and then combining that information with an end user's demographic information.

BACKGROUND OF THE INVENTION

The Nielsen ratings have long been a stable means to gauge the national market impact of advertising on television. More often than not, web sites use a simple "hits" metric. A "hit" indicates how many times a web page has been accessed, but not by whom. Many web sites also compromise privacy by recording people's Internet data such as their web Internet address, after which the person may receive unsolicited junk mail or advertising (e.g. "spamming"). This data is also used for marketing purposes by other companies, which raises privacy concerns.

The World Wide Web (WWW) is a system of Internet servers that support specially formatted documents, and is a packet based communications network. The documents are formatted in a language called Hyper Text Markup Language (HTML). Users access the WWW, for example, via personal computers (PC) or workstations running web browsers. Web browsers are software applications used to locate web pages and allow a user to graphically display pages of a web site or document. Examples of web browsers are Microsoft's Internet Explorer and Netscape's Navigator. In order to connect a web site to the World Wide Web, a user such as a corporation wishing to have an web site, pays a fee to a domain name registration company (such as the Internet Corporation for Assigned Names and Numbers (ICANN)) and the domain name registration company assigns an address to the user. This address is guaranteed to be unique. This World Wide Web address is called a Universal Resource Locator (URL). The URL is a global address of documents and other resources on the World Wide Web and defines a path to a data file on the user's computer. The data file is the user's web page. The URL of a web page is paired with a textual name. For example, Lucent's World Wide Web address for the Mount Olive Product Realization Center web page is www.mtt.lucent.com, which corresponds to the numerical value 135.5.146.6.

SUMMARY OF THE INVENTION

The present invention is direct to a method and system for using a computer to gather information of an end user's visits to web pages and the duration and date of each visit, and then pairing this data with the user's demographic data. The method and system includes the steps of monitoring the web pages the end user visits; recording the duration and date of each visit to a web page; and saving the recorded information in the end user's computer. The method and system further includes the steps of providing a data processing computer for storing demographic data of the end user; storing the end user's demographic data in the data processing computer; uploading upon selective operation by the end user's computer in one direction from the end user's computer to the data processing computer, the duration and date of visit information saved to the end user's computer; matching the information uploaded with the end user's demographic data; collating based on the end user's demographic information, the information resulting from the previous step, and saving this information in the data processing computer. The above steps are then repeated for more than one end user.

The method according to the present invention accurately assesses who is visiting various web pages by recording the URLs and then pairing this data with users' demographic data. The method according to the present invention is a voluntary and protects an individual's privacy.

BRIEF DESCRIPTION OF THE DRAWINGS

FIG. 5 is a block diagram showing use of plug-in software according to the present invention to retrieve data of a user's visits to web pages using the system according to the present invention;

FIG. 6 is a block diagram showing use of plug-in software according to the present invention to upload and store data to a data processing computer.

DETAILED DESCRIPTION OF THE INVENTION

The present invention is directed to a system for gathering data as to which web pages an individual visits, the date of each visit, and the duration of time of each visit, while protecting the individual's privacy. The data is collected over time, transmitted to a data processing computer and then combined with a user's demographic data. This combined data can then be collated based on each user's demographic profile and saved to the data processing computer. The collated data may then be sold, for example, to Internet Service Providers (ISPs) or advertisers as a means to determine the effectiveness of their web pages and any advertising displayed in the web pages. Above all, the method according to the present invention is secure and voluntary. Preferably, a group of individuals would be statistically selected based on demographics to participate in data collection.

Figure 1:
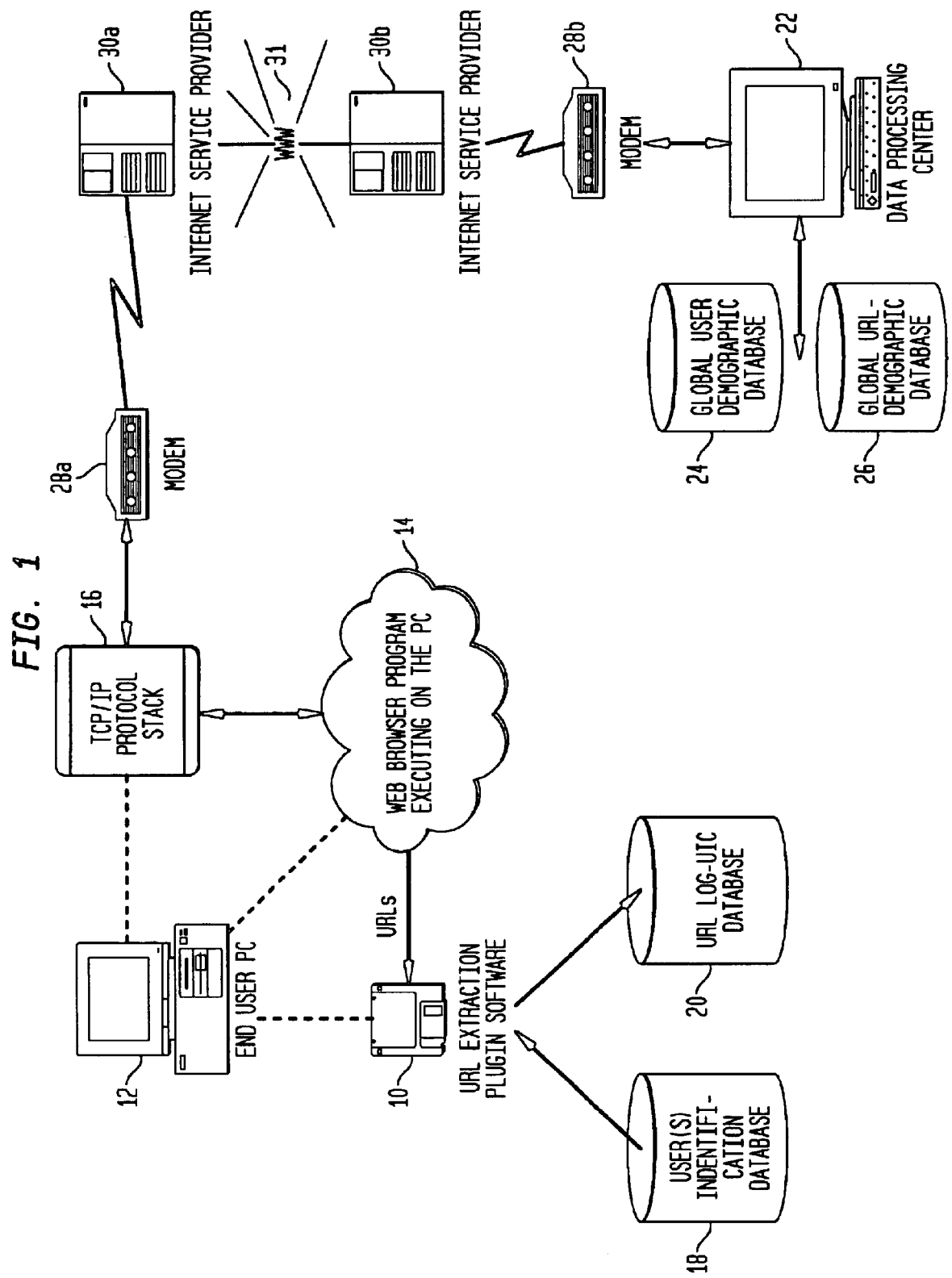
FIG. 1 illustrates a first embodiment of the system according to the present invention.

FIG. 1 illustrates one embodiment of the system according to the present invention. Plug-in software 10 is a software module that can be installed into a web browser 14 on a user's personal computer 12 to add additional functional features. Plug-in software 10 monitors and records URL's as a user accesses web pages. Plug-in software 10 is designed to run on a web browsers and platforms, such as Microsoft's Internet Explorer®, UNIX® or LINUX. Plug-in software 10 also records the date of each web page visit, the duration of each visit, and some key words typical of the subject matter of each web page visited. This information is then paired with the user's identification information using a user's user identification codes (UIC) to ensure privacy. When a user starts a web browser program 14 to access the Internet, the user is prompted to inform the URL monitoring plug-in software 10 under which user (such as "Mom," "Dad," or "Junior") is using the system. An example of the prompt screen is shown below in FIG. 2.

Plug-in software 10 captures a web page URL by monitoring the transport control protocol/Internet protocol (TCP/IP) stack 16 on user's computer 12. TCP/IP stack 16 sends and receives data over the Internet 31. When a user logs onto the Internet using web browser 14, plug-in software 10 monitors the TCP/IP stack 16 to extract web page URL's. Plug-in software 10 records URL address data by monitoring TCP/IP stack 16 for address related packets, and then processing the address related packets as follows. As packets are received from the top of TCP/IP stack 16, a copy of the packet is forwarded to plug-in software 10. The original packet is sent to its proper destination without any interruption or alteration. As most operating systems provide for multiple concurrent processing or multitasking, plug-in software 10 does not add any serial processing delays. Plug-in software 10 does not interfere with the browser's functionality.

Alternatively, software running in the background could also perform the same functions as plug-in software 10, thereby further decoupling the web browser from the function. Under this alternative, if plug-in software 10 is not used as an add-in module to user's web browser 14, an alternative would be to create a background task stored on user's personal computer 12 to carry out the same functions as plug-in software 10. A task running in the background allows the system to function as normal, but the background task would be triggered by the event of receiving a packet from TCP/IP stack 16. The packet would be forwarded to the background task after web browser 14 has processed it. The background task would then performs all the functions of plug-in software 10.

Another alternative to monitor and gather URL data is for the background task or plug-in software 10 to periodically monitor the cache of web browser 14. The cache stores images of web pages and web page addresses that a user has visited. This allows the web page to be quickly redisplayed by reading the web page from the user's local disk and not from the Internet. The background task of plug-in software 10 would then scan the cache area for new URLs and perform the functions of plug-in software as described above.

Two relational databases in user's personal computer 12 are used to record a user's data during each Internet session. The first relational database is a user identification database 18 which contains, for example, each user's user identification code and logon name, as described in Table 1.

TABLE 1

| Field Name | Description |
| --- | --- |
| UIC | User Identification Code, a 10 digit unique alpha-numeric character |
| Logon Name | Text displayed to allow the user to identify themselves on the "Who You Are?" screen, preferably not a real name. |

A user's UIC is unique to each user and is, for example, a ten digit alphanumeric identifier. A user's logon name is any text a user chooses as an on-line moniker (screen name). Preferably, the logon name is not the user's real name.

User identification database 18 is protected via standard password encryption such as encryption methods available as part of any web browser, or more sophisticated encryption methods such as Pretty Good™ Privacy, Data Encryption Standard (DES); or Rivest, Shamir, and Adelman (RSA) encryption. It is contemplated that an individual's personal information in the user identification database 18 will not be transmitted to web page providers or Internet service providers. Only the UIC would be transmitted along with the URLs stored. The UIC offers complete privacy by not associating any personal or private information in the data transferred. Preferably, user identification database 18 is stored in personal computer 12 in a compressed, encrypted form.

The second relational database is URL log-UIC database 20 which holds records of which web pages a user has visited, the date of each visit, and the duration of each visit, matched with the user's user identification code. URL log-UIC database 20 typically includes the following fields.

TABLE 2

| Field Name | Description |
| --- | --- |
| UIC | User Identification Code, a 10 digit unique alpha-numeric character |
| URL | numeric (e.g., 134.5.56) address of web site |
| Date | mm/dd/yyyy, Y2K complaint date |
| Time Start | 24 hour time when the user started to access a web site |
| Time End | 24 hour time when the user left the web site |
| Site Classification | Based on a scan for key words, each web site will be classified as sports, entertainment, news, etc. |

URL log-UIC database 20 has a key which ensures that only one occurrence of each web page for a given time and data has been stored. In this way, the URL log-UIC database 20 can index data stored therein. The key includes the UIC, URL, Date and Time Start fields. Once a URL is added to URL log-UIC database 20 for a specific time and date, the same URL would not be entered again if a user returns to the main web page after selecting other options on the page. Also, by parsing the web page address, it is possible to select only the main web page URL to be saved. One way of accomplishing this is to search for the delimiter '/'. Plug-in software 10 may also be configured to allow sub-pages of web sites to be saved.

Key fields in Tables 1 and 2 are used to retrieve and relate information in each of the databases and with other databases. For example, the user identification code is a key field in Tables 1 and 2 used to relate a particular user of the system with the data for the particular user in URL log-UIC database 20, and to retrieve unique records stored in URL Log-UIC database 20. URL log-UIC database 20 is protected by standard password encryption as discussed above. Data in URL log-UIC database 20 is not automatically transmitted from personal computer 12 unless the user chooses to do so.

At regular time intervals, for example once a month, a user will be prompted by plug-in software 10 to voluntarily access a web page at a data processing center 22 web site to upload the contents of URL log-UIC database 20 to the data processing center. Data in this database is transmitted utilizing robust encryption methods such as Pretty Good™ Privacy (PGP); Data Encryption Standard (DES); or Rivest, Shamir, and Adelman (RSA) encryption. For example, if PGP is used, the user's computer encrypts contents of the UIC database 20, enters the public key of the data processing center 22 and then transmits the encoded data to data processing center 22. At center 22, the private key is then used to decode the data. Data processing center 22 receives data from URL log-UIC database 20 and retrieves the user's full demographic data based on the user's UIC, from global user demographic database 24. Global user demographic database 24 holds demographic data for all users of the system and is stored in data processing center 22. Table 3 shows typical demographic data in global user demographic database 24. Users' demographic data is supplied off-line to data processing center 22 for input to global user demographic database 24, for example, during a registration process over the telephone or by conventional mail. One or both of the UIC and logon name in the URL LOG-UIC database 20 are then used to match the information in that database with a users demographic data in global user demographic database 24.

TABLE 3

| Field Name | Description |
| --- | --- |
| UIC | User Identification Code, a 10 digit unique alpha-numeric character |
| Logon Name | Text displayed to allow the user to identify themselves on the "Who You Are?" screen, not a real name. |
| Age | xxx |
| Sex | M/F |
| Ethnic Background | e.g., Caucasian, African American, etc. |
| Physical Disabilities | e.g., blind, hearing |
| State | FF |
| Country | NN |
| Zip Code +4 | Identifies town |
| Town Name | Toledo, Ohio; Scranton, PA |
| PC Type | Manufacturer, mode codes |
| ISP | Internet Service Provider |

Data processing center 22 then collates the received data and saves it in global URL-demographic database 26. Global URL-demographic database 26 receives and holds all users' data for web pages visited, date of each visit, and duration of each visit for all users, combined with all users' demographic data from global user demographic database 24. Global URL-demographic database 26 receives data from other users throughout the world, and then organizes the data according to users' demographic profiles. Data typically is transmitted from the personal computer 12 to data processing center 22 using modems 28a and 28b or similar communications hardware, through one or more Internet Service Providers 30a and 30b, over the Internet 31.

Data sets in global URL-demographic database 26 could be sold to owners of web pages, Internet Service Providers, and advertisers. Users voluntarily subscribe to this service and are compensated by the company owning Data Processing Center 22 with cash, in kind services, or through discounts such as reduced rate internet access. The system according to the present invention allows only one way communication flow from the end user's personal computer 12 to data processing center 22, and requires no user intervention or modification of existing web sites. The main goal is to provide a means to gauge the effectiveness of a web page by measuring who is accessing a particular site, and for how long. The users receive no feedback from using the mechanism.

Figure 3:
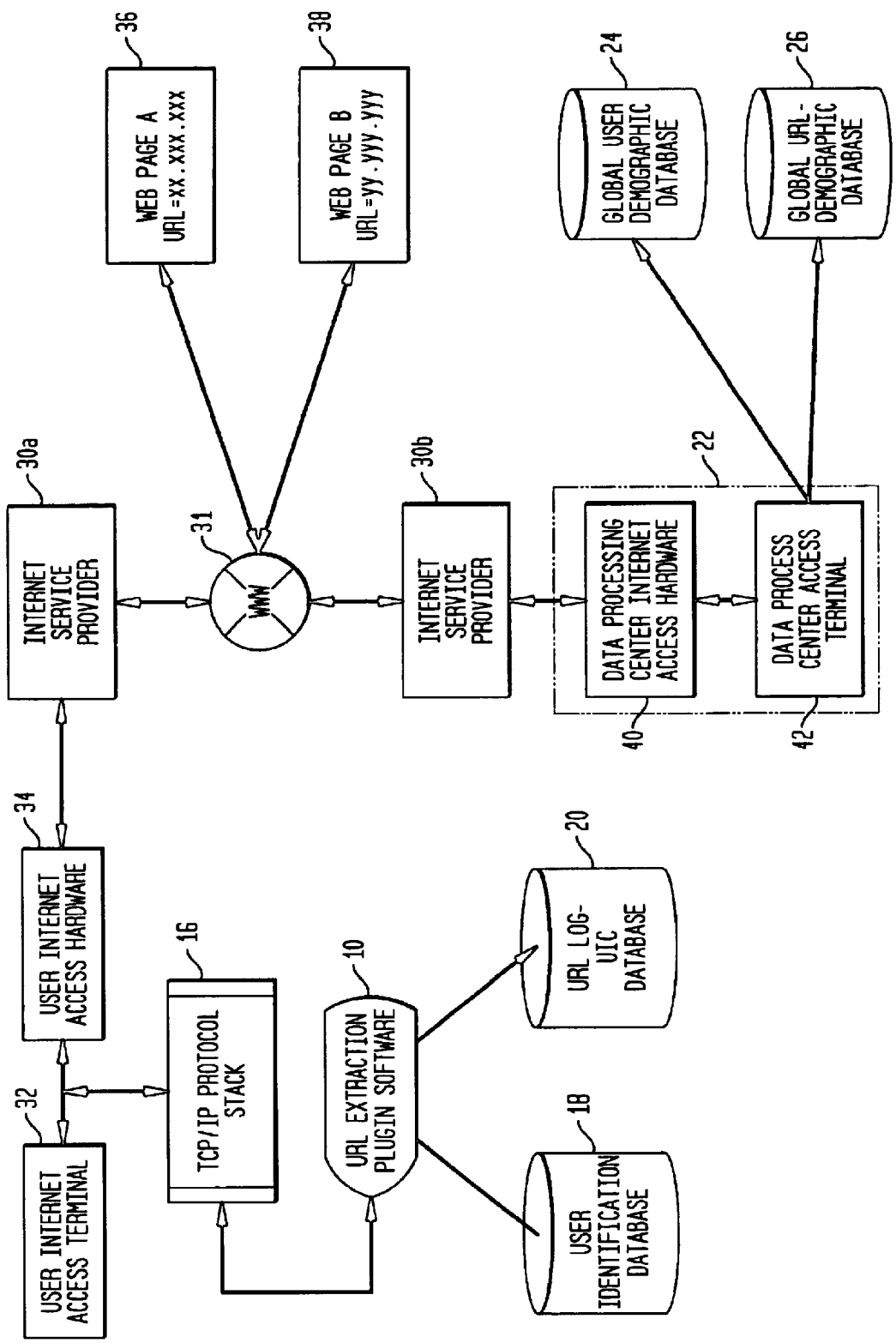
FIG. 3 is a block diagram of the system in FIG. 1.

FIG. 3 is a high-level block diagram describing the system shown in FIG. 1. A user's computer or workstation 12 includes user Internet access terminal 32 (e.g., a personal computer, workstation, etc.) and user Internet access hardware 34 (e.g., modem or intranet card). User Internet access hardware 34 is connected to Internet service provider (ISP) 30a via communications hardware such as modem 28a. The user accesses various web pages such as web page A (identified by reference numeral 36) having corresponding URL number xx.xxx.xxx or web page B (identified by reference numeral 38) having corresponding URL number yy.yyy.yyy. After installing plug-in software 10, the user is prompted to inform the system which user profile held in user identification database 18 to use for the upcoming Internet session.

The user then starts web browser 14 (see FIG. 1) in access terminal 32 to access and view web pages 36 and 38. Web browser 14 interacts with plug-in software 10 allowing plug-in software 10 to monitor and collect URL addresses visited, date of visits, and duration of time each web page is visited, and saves this information under the user's user identification code (UIC) in URL-log UIC database 20. As explained more fully below with respect to FIG. 5, plug in software 10 also collects and saves key words which describe the nature of each web site visited. URLS, date of visit, and duration of visit data is collected as plug-in software 10 in user's personal computer 12 monitors the transport control protocol/Internet protocol (TCP/IP) stack 16, preferably using function calls of toolkit software. TCP/IP stack 16 preferably is located between the operating system 60 and web browser 14. The toolkit software is a third party product that allows developers to create plug-in modules such as plug-in software 10. The toolkit would create an executable module, linking in various libraries for functionality. The libraries are collections of distributable object code. The toolkit typically will not reside on end user's personal computer 12. Rather, it will reside remote from user's personal computer 12.

Data collected by plug-in software 10 is then stored in URL log-UIC database 20 on a local drive in user's computer 12, protected by standard encryption in a compressed form. URL-UIC database 20 has built-in password protection, which encrypts the data and requires a password to view or modify the records in that database. For example, URL-UIC database 20 is encrypted in a ZIP format (Nico Mak Computing, Inc.). In addition, there are easily accessible software libraries which may be added to plug-in software 10 to incorporate compression technology into the present invention. Saving the collected data in an encrypted, compressed form ensures a user's privacy, anonymity and low disk space storage requirements. Data in URL log-UIC database 20 is then voluntarily uploaded by the user over Internet 31 to a data processing center 22 using data processing center Internet access hardware 40. The data is then manipulated and collated using access terminal 42, as described above with respect to FIG. 1. For example, data transferred from the user is matched and added to data from other users with similar demographic backgrounds. The demographic data may also be analyzed to identify profiles for individuals visiting specific URL sites. Data may also be archived to be used for future analysis.

Figure 4:
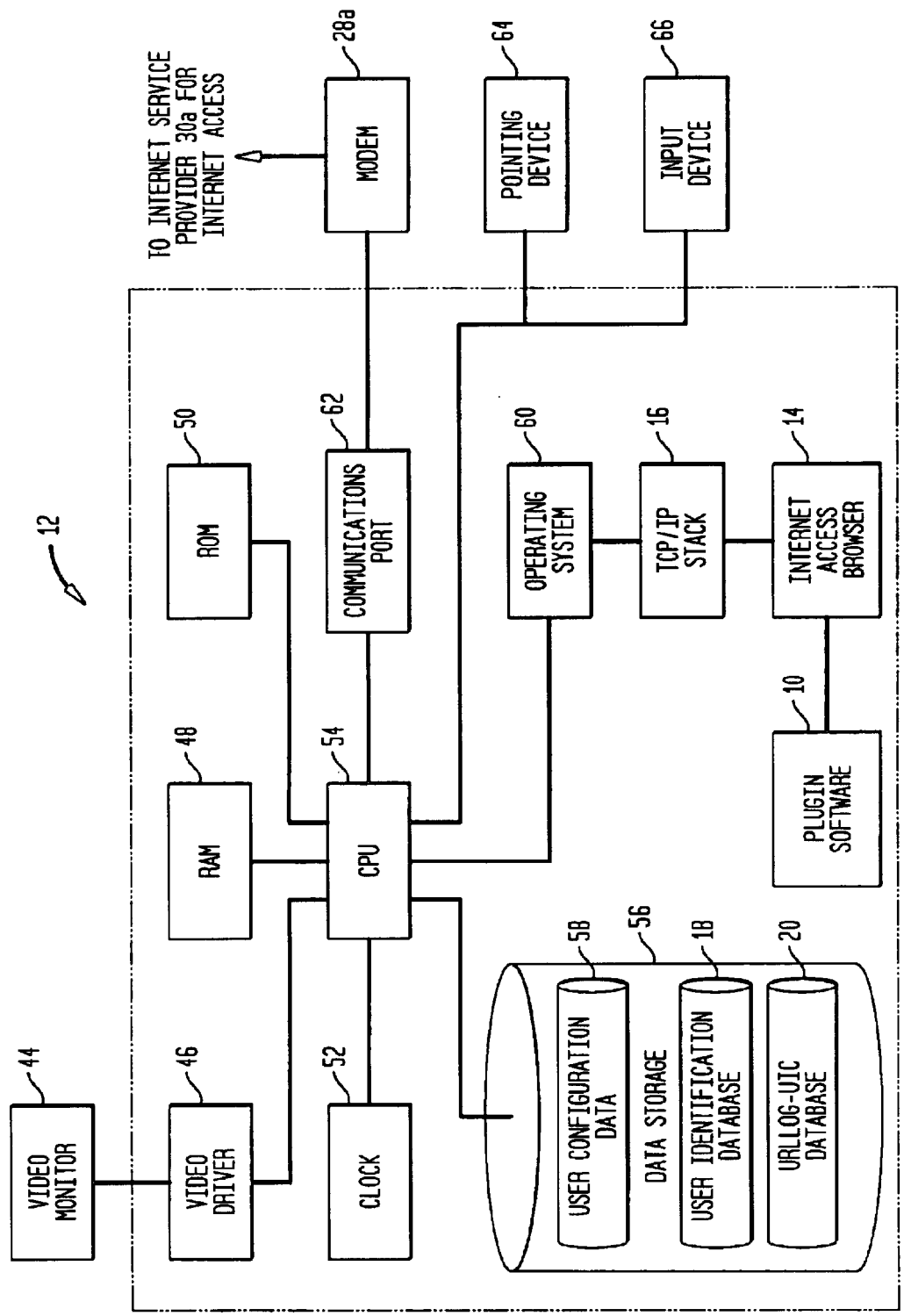
FIG. 4 is a block diagram of a user's personal computer for use in the present invention.

FIG. 4 is a block diagram of the components of a user's personal computer 12 used to access and interact with the Internet. Personal computer 12 includes video monitor 44, video driver 46, random access memory (RAM) 48, read only memory (ROM) 50, clock 52, central processing unit (CPU) 54, and data storage device 56 holding user configuration data 58, user identification database 18, and URL log-UIC database 20. Personal computer 12 also includes operating system 60, Internet access browser 14, and plug-in software 10. Plug-in software 10 interacts with browser 14 and stores data to data storage device 58, which as described above, includes user identification database 18 and URL LOG-UIC database 20. Personal computer 12 accesses the Internet through communications port 62 and modem 28a. A user interfaces with personal computer 12 using a pointing device 64 (such as a mouse), and input device 66 (such as a keyboard).

Figure 2:
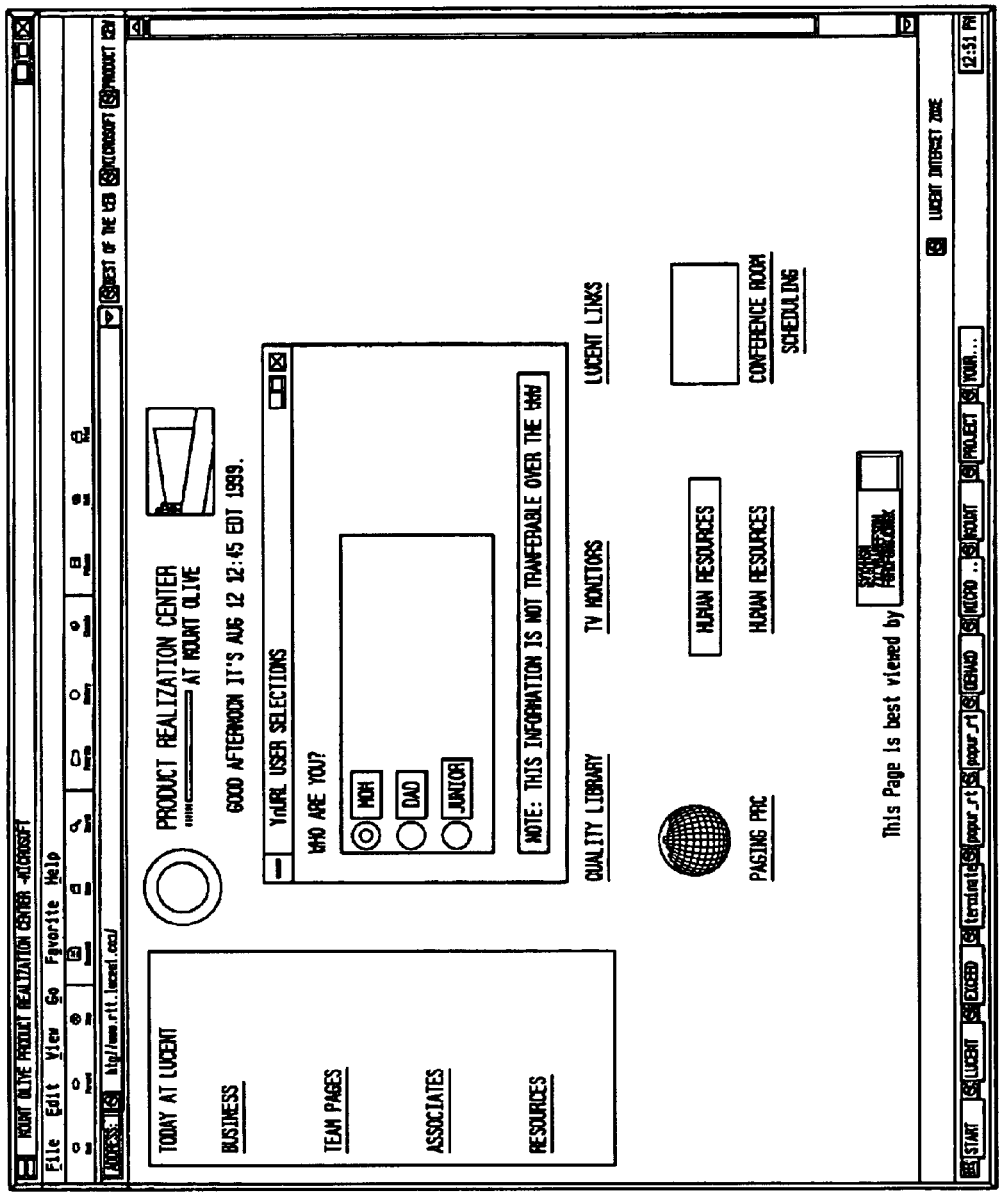
FIG. 2 is printout of a typical prompt screen used to inform plug-in software according to the present invention, which user is using the system of FIG. 1.

FIG. 5 is a flow chart diagram which shows the operation of plug-in software 10. At step 68, a user logs onto the Internet using his/her browser 14. At step 70, plug-in software 10 prompts the user for user identification which includes the user's moniker (such as "Mom," "Dad," or "Junior") and is linked to the user's user identification code. Each user is assigned, for example, a unique 10 digit alphanumeric code which is linked to their user moniker. A typical identification page is shown in FIG. 2 and allows the user to identify him/herself to the system prior to the start of each Internet session. At step 72, the user accesses a web page. For example, if the user accesses Lucent's Mount Olive Product Realization Center through web page URL address www.mtt.lucent.com, plug-in software 10 retrieves corresponding URL numerical value 135.5.146.6.

At step 74, plug-in software 10 monitors the TCP/IP stack 16 and retrieves data regarding each URL visited, the date of each visit, and the start time and end time of each visit. Plug in software 10 scans the data file for the web page to identify several key words from the text of the web page. Insignificant words such as "the," "and," and "or" are ignored and more significant words that occur more than a threshold number of times on the page are extracted as the key words. These key words are then related to one another to generally classify the content of the web page. For example, words ending in "ball" may indicate a sports web page; multiple uses of "Hollywood" may indicate an entertainment web page, the term "Reuters" may indicate a business news related web page. In this way, a high level subject matter classification of a site is obtained. One way of accomplishing this classification is to distribute a list of words and classifications in a database on user's personal computer 12. The database is then scanned as an HTML page is opened, and if any words match, a classification is generated. Plug-in software 10 then saves this data, along with the URL, date of visit and duration of visit data in URL LOG-UIC database 20 under the user's User Identification Code (UIC). The site classification, which may be a single word or abbreviation, would be added to the URL log-UIC database 20. In step 78, if the user accesses a new web page, steps 74 and 76 are repeated. If the user does not access a new web page in step 78, the system exits the user from the Internet in step 80.

FIG. 6 is a block diagram showing the uploading of data in URL log-UIC database 20 collected in FIG. 5 to data processing center 22. A user voluntarily uploads data in URL log-UIC database 20 by performing the following steps. In step 82, a user logs onto the Internet using browser 14. In step 84, plug-in software 10 prompts the user for the user's user identification code (UIC) or user name. If a predetermined time period (for example, 30 days) has passed since the user last uploaded data to data processing center 22, plug-in software 10 in step 88 continues the uploading sequence. In step 88, plug-in software 10 directs the user to a controlled web site hosted by data processing center 22. If the predetermined time period has not elapsed, step 86 discontinues the upload sequence and directs the user in step 90 to continue normal operation of the steps in FIG. 5 until such predetermined time has passed. Assuming the predetermined time has passed, in step 92, plug-in software 10 switches web browser 14 into a secure transfer mode. Secure transfer mode typically is indicated by a closed lock symbol at the bottom of a video monitor 44 and allows a user to upload data from personal computer 12 to data processing center 22 using encryption security. Examples of such encryption security include PGP, RSA, and DES. In step 94, plug-in software 10 uploads data from URL log-UIC database 20 to data processing center 22 for further processing as described above with respect to FIGS. 1 and 3. After uploading data from personal computer 12 to data processing center 22, plug-in software 10 in step 96 switches web browser 14 out of secure mode and normal operation of the system described shown in FIG. 5 continues.

As described above, all communication between the user and Data Processing Center 22 is in only one direction, that is, data travels only from the user to Data Processing Center 22. Data Processing Center 22 never prompts an end user to upload any information and never receives any data unless the user voluntarily uploads the data. The rewards may then be distributed via paper gift certificates, electronic gift certificates, credit cards or allowing the user to select a gift from a rewards Web page.

Data collected in the methods of the present invention can be used by companies to judge the effectiveness of web pages, and to justify rates for advertising and/or to refine web page content. Also, the present invention does not require any special modifications to existing or future web pages. The method according to the present invention is transparent to the user except for the modem being tied up. For example, users could leave a modem on overnight and have data sent during off-hours.

The method according to the present invention has several safety aspects. For example, (1) a user does not have to enter and transmit demographic data over the Internet, (2) the method encrypts confidential information, and (3) the method is voluntary and provides for data collection at a user's personal computer and then voluntarily uploading the data at a later date to a data processing center.

The preceding description merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

As such, the present invention is not intended to be limited to the details shown. Rather, various modifications and additions may be made in the details within the scope and range of equivalents of the claims and without departing from the present invention.

What is claimed is:

1. A method for using a computer to gather information of an end user's visits to web pages and a duration of each visit, the method comprising the steps of:

(a) monitoring the web pages the end user visits;

(b) recording the duration and date of each visit monitored in said step (a);

(c) saving information recorded in said step (b) in the end user's computer;

(d) acquiring the end user's consent to upload saved information; and (e) uploading saved information upon selective operation by the end user from the end user's computer to a data processing computer, the information saved to the end user's computer in said step (c).

2. The method of claim 1, further comprising the steps of:
classifying a subject matter of each web page visited; and
recording the subject matter in step (b).

3. The method of claim 1, wherein the information saved in step (c) is compressed and encrypted.

4. The method of claim 1, wherein the information saved in said step (c) is stored under an end user's user identification code.

5. The method of claim 4, wherein the user identification code is an alpha-numeric character.

6. The method of claim 1, wherein the step of uploading saved information upon selective operation by the end user further comprises:
requesting the end user to upload the saved information upon expiration of a user defined time interval, the saved information further including URLs the user has previously visited and the duration of time the user has spent visiting these URLs;
selecting to upload the saved information;
prompting the end user for his or her user identification code or user name;
inputting the end user information on the end user's computer; and
uploading the user identification code and the saved information to a data processing computer without receiving any information from the data processing computer to be displayed to the end user.

7. The method of claim 6 further comprising the step:
rewarding the end user for choosing to upload the saved information.

8. A computer connected to the Internet for gathering information as to which web pages an end user visits, the date of each visit, and the duration of each visit, the end user visiting web pages through a web browser, the system comprising:
a user interface;
a processor for running program code to monitor information from the web pages visited by the web browser, the monitored information including URLs visited by the end user and the duration of time spent visiting these URLs; and
a first user database for storing the monitored information, said processor saving the monitored information to said first user database, said processor operating to periodically request the user at the expiration of a predefined time interval to consent to uploading the monitored information to a data processing computer through the Internet, said user interface displaying the periodic requests to the user.

9. The computer of claim 8 wherein monitored information is paired with an end user's user identification code.

10. The computer of claim 8 wherein the processor passively monitors a TCP/IP stack protocol to retrieve the monitored information.

11. The computer of claim 8 wherein the processor monitors the web browser cache to retrieve the monitored information.

12. The computer of claim 8 wherein the monitored information is compressed and encrypted before being uploaded.

13. The computer of claim 8 further comprising:
a second database for storing user identification information including a user identification code, said user identification code being used as a key to relate corresponding monitored information in the first user database with the user identification information.

14. A data system accessed through the Internet for processing end users' Internet visits to web pages and the duration of these visits, the system comprising:
a first database storing user demographic information, said first database populated with user demographic information off-line and with end users' consent;
a processor for receiving uploaded monitored information from an end user's computer, said monitored information including the URLs visited by end users and the duration of time spent visiting these URLs, said monitored information being received after acquiring consent to upload said monitored information from an end user, said processor organizing the received monitored information according to user demographic information stored in said first database; and
a second database for storing the organized information.

15. The data system of claim 14, wherein the processor is operative to receive monitored information without transmitting any information which would be displayed to an end user.

16. The data system of claim 14 wherein the demographic information and the monitored information include an end user identification code for matching monitored information with demographic information.

17. The data system of claim 14 wherein the demographic information comprises the end user's age, sex, ethnicity, nationality, physical disability, and address.

18. A method for using a data processing system for processing end users' Internet visits to web pages and the duration of these visits, the method comprising the steps of:
(a) storing end users' demographic data in a first database of the data processing computer;
(b) receiving uploaded monitored information from an end user's computer wherein said monitored information including the URLs visited by end users and the duration of time spent visiting these URLs, said monitored information being received after acquiring consent to upload said monitored information from an end user;
(c) matching the monitored information with the stored end user information; and
(d) organizing the received monitored information according to the stored end user demographic data,
(e) repeating steps (b) to (d) for more than one end user.

19. The method of claim 18 wherein in said matching step comprises the step of:
comparing an end user identification code stored with the end user information with an end user identification code carried in the uploaded monitored information.

20. The method of claim 18 wherein end users' demographic data comprises an end user's age, sex, ethnicity, nationality, physical disability, and address.

* * * * *